(12) United States Patent
Walker

(10) Patent No.: US 7,841,123 B2
(45) Date of Patent: Nov. 30, 2010

(54) WATERFOWL FEEDING DECOY

(76) Inventor: Chris F. Walker, R.R. 3, Box 87, Golconda, Pope County, IL (US) 62938

( * ) Notice: Subject to any disclaimer, the term of this patent is extended or adjusted under 35 U.S.C. 154(b) by 133 days.

(21) Appl. No.: 11/983,591

(22) Filed: Nov. 9, 2007

(65) Prior Publication Data

US 2008/0115399 A1    May 22, 2008

Related U.S. Application Data

(60) Provisional application No. 60/858,273, filed on Nov. 9, 2006.

(51) Int. Cl.
*A01M 31/06* (2006.01)
(52) U.S. Cl. .................................. 43/3; 43/2
(58) Field of Classification Search ........... 43/2, 43/3
See application file for complete search history.

(56) References Cited

U.S. PATENT DOCUMENTS

| | | | | |
|---|---|---|---|---|
| 4,566,214 A | * | 1/1986 | McCrory et al. ............. | 43/3 |
| 5,930,936 A | * | 8/1999 | Parr et al. .................. | 43/3 |
| 6,845,586 B1 | * | 1/2005 | Brock, IV .................. | 43/3 |
| 7,322,144 B2 | * | 1/2008 | Brewer ..................... | 43/3 |
| 2008/0028664 A1 | * | 2/2008 | Anthony .................... | 43/3 |
| 2008/0155878 A1 | * | 7/2008 | Myers ...................... | 43/3 |
| 2009/0151217 A1 | * | 6/2009 | Gregory .................... | 43/3 |

* cited by examiner

*Primary Examiner*—Kimberly S Smith
(74) *Attorney, Agent, or Firm*—Gary K. Price

(57) ABSTRACT

A waterfowl feeding decoy having a body mounted to a motor, and a box member that includes a pivotally attached top member such that opening the top member allows access to a chamber disposed within the box member, and closing the top member forms a watertight seal between the top member and the box member. A power source is disposed in the chamber, and electrical wires extend from the power source up through an aperture and are electrically connected to the motor. The box member serves as a watertight storage means for the power source and further serves as an anchor for anchoring the decoy at a selected location.

13 Claims, 2 Drawing Sheets

WATERFOWL FEEDING DECOY

CROSS REFERENCES TO RELATED APPLICATIONS

U.S. Provisional Application for Patent No. 60/858,273, filed Nov. 9, 2006, with title "Waterfowl Feeding Decoy" which is hereby incorporated by reference. Applicant claims priority pursuant to 35 U.S.C. par. 119(e)(i).

Statement as to rights to inventions made under Federally sponsored research and development: Not Applicable

BACKGROUND OF THE INVENTION

1. Field of the Invention

This invention is generally directed to a decoy for luring waterfowl for hunting purposes. Specifically, the present invention relates to a waterfowl decoy that simulates feeding in water.

2. Brief Description of Prior Art

The use of floating decoys is widespread when hunting for waterfowl. A typical decoy floats on a lake or stream and has the shape and color of a waterfowl above the water. In order to serve their purpose, it is most desirable if the decoy realistically simulates a goose, a duck, or waterfowl to be attracted. In order to make decoys more lifelike, numerous attempts have been made to automate a decoy or provide moving parts to simulate a moving waterfowl. In this regard, several types of decoys utilize radio control and motorized decoys. Even though these innovations may be suitable for the specific individual purposes to which they address, they differ from the present invention. The need continues to exist for a decoy that simulates normal waterfowl in a lifelike manner.

The prior art does not disclose a combination of features evident in the present decoy. Thus, a waterfowl feeding decoy that is affordable, light weight, convenient to set up, easy to operate, and effectively simulates normal waterfowl is desired.

As will be seen from the subsequent description, the preferred embodiments of the present invention overcome the shortcomings of the prior art decoys.

SUMMARY OF THE INVENTION

The present invention is a waterfowl feeding decoy that simulates normal waterfowl in a lifelike manner, thereby providing a realistic simulation of waterfowl for hunting and the like. The decoy generally includes a body appropriately mounted to a motor, and a box member to suspend beneath the water surface. The box member includes a top member pivotally attached to the box member such that pivotally opening the top member allows access to a chamber disposed within the box member. Closing the top member and fastening the top member to the box member forms a watertight seal between the top member and the box member so that when suspended beneath the water surface, the chamber remains moisture-free. The top member further includes an aperture disposed at a top end of the top member. In application, a power source is positioned in the chamber of the box member and electrical wires extend from the power source up through the aperture, electrically connected to the motor. The box member serves as a watertight storage means for the power source and further serves as an anchor for anchoring the decoy at a selected location. The power source is preferably a 6 to 12-volt power source. The activation of the power source activates the motor to provide oscillation of the body. The oscillating movement of the decoy creates a rippling effect in the water surrounding the decoy while moving the decoy to emulate a natural feeding position of ducks and other waterfowl.

DESCRIPTION OF THE PREFERRED EMBODIMENT

In accordance with the present invention, a waterfowl feeding decoy is disclosed. The decoy apparatus is directed to a decoy that operates in a feeding position for luring waterfowl for hunting purposes. In the broadest context, the waterfowl feeding decoy of the present invention consists of components configured and correlated with respect to each other so as to attain the desired objective.

Figure 1:
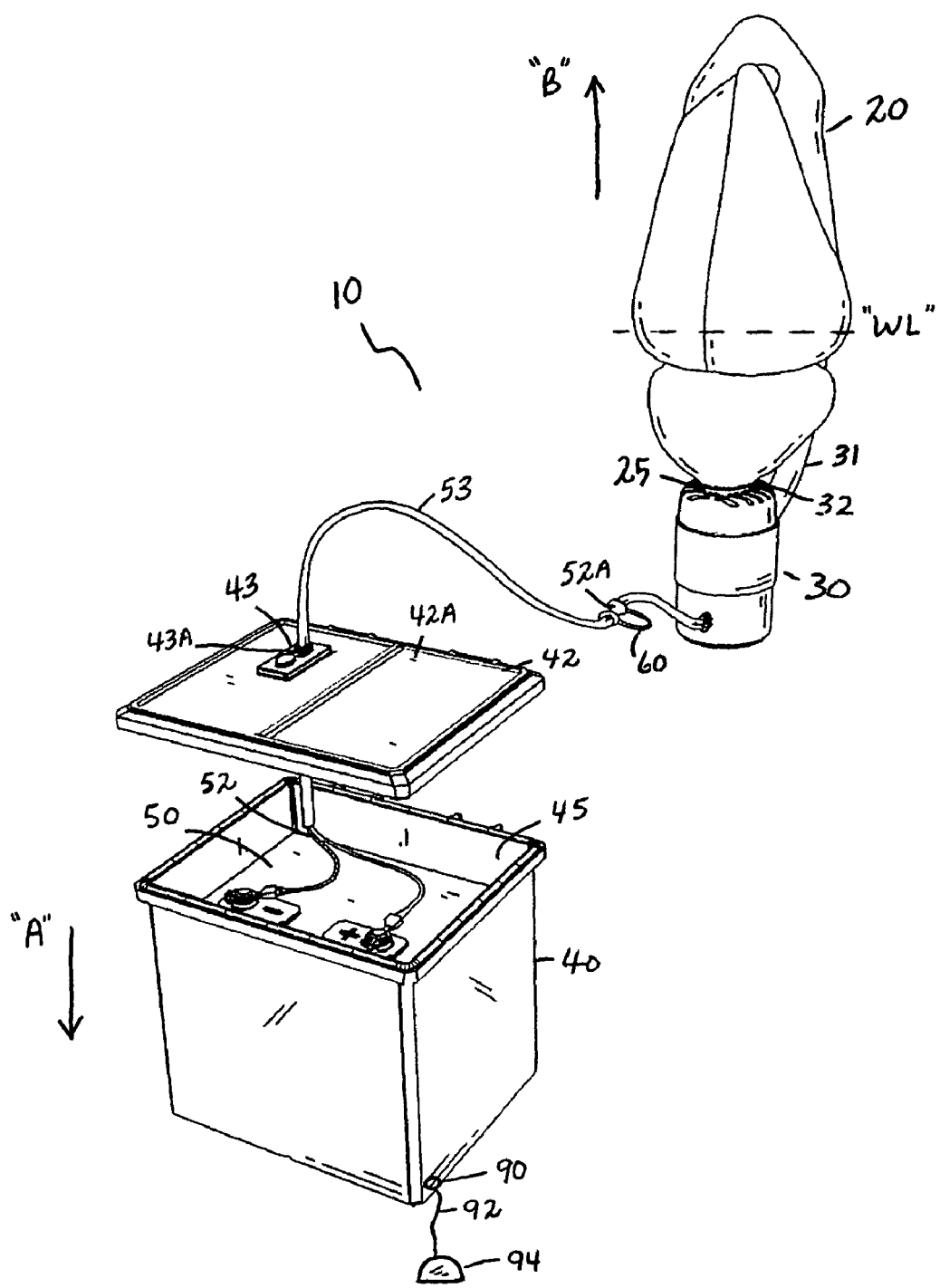
FIG. 1 is an exploded view of the preferred embodiment of the present invention, a waterfowl feeding decoy.
Figure 2:
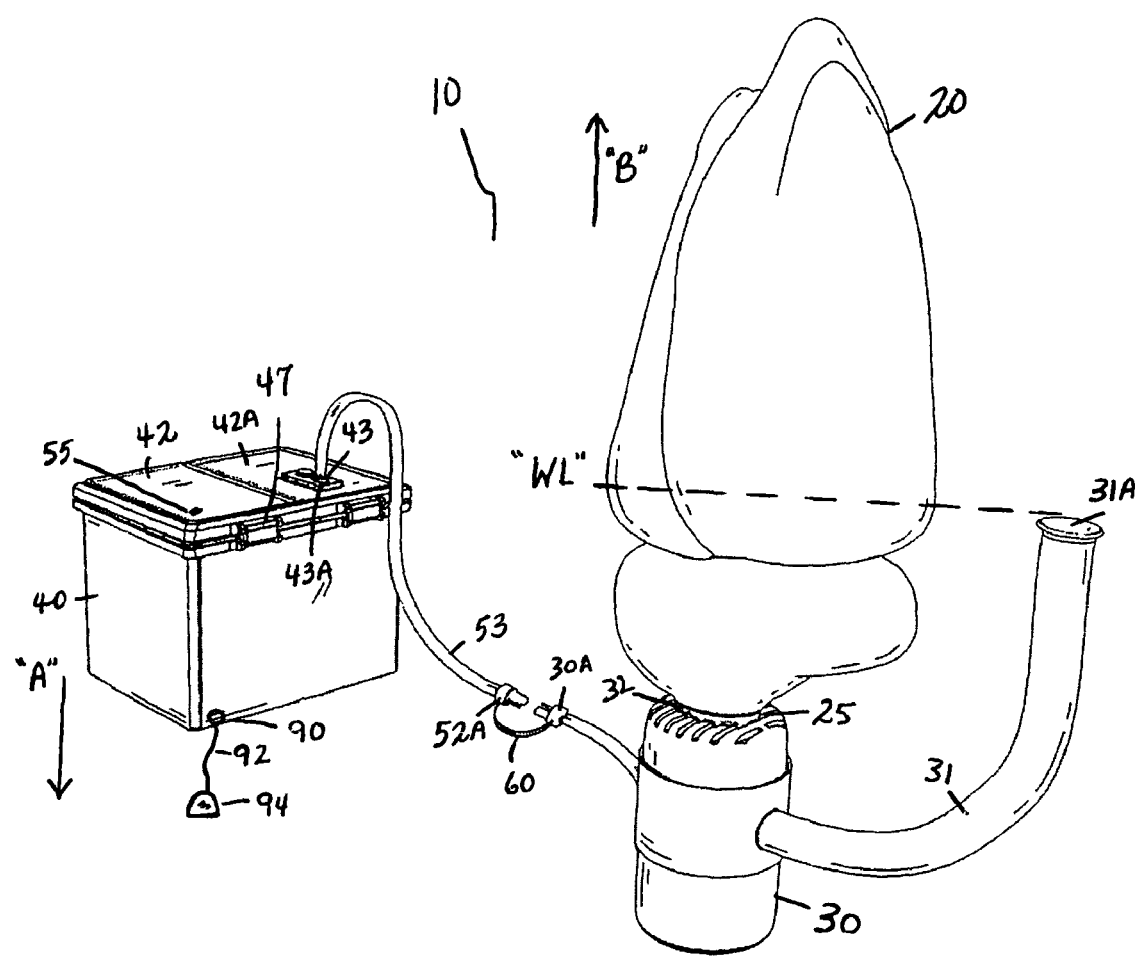
FIG. 2 is a perspective view of the waterfowl feeding decoy of FIG. 1.

FIGS. 1-2 illustrate the preferred embodiment of a waterfowl feeding decoy 10 made in accordance with the present invention. The decoy apparatus 10 generally includes a partial body 20 appropriately mounted to a motor 30. The body 20 forms an open shell and is hollow on the interior and is shaped and decorated for the exterior to resemble the rearward body portion of the selected waterfowl. The body 20 includes mounting means such as a housing 25 in order to attach the body 20 to the motor 30 preferably with screws 32. Ideally, the motor 30 is designed for submersible operation for example, the motor 30 might include a bilge pump.

The decoy 10 further includes a box member 40 to suspend beneath the water surface (not shown) in a manner that will be described hereinafter.

The box member 40 includes a top member 42 pivotally 41 attached to the box member 40. Pivotally opening the top member 42 from the box member 40 allows access to a chamber 45 disposed within the box member 40. In application, closing the top member 42 and fastening the top member 42 to the box member 40 with fastener 47 forms a watertight seal between the top member 42 and the box member 40 so that when the box member 42 is suspended beneath the water surface, the chamber 45 remains moisture-free.

The top member 42 further includes an aperture 43 disposed at a top end 42A of the top member 42. In application, a power source 50 such as a battery is positioned in the chamber 45 of the box member 40 and electrical wires 52 extend from the power source 50 up through the top member 42 and aperture 43, electrically connected to the motor 30. Sealing means 43A known in the art forms a watertight seal with respect to the wirings 52 and aperture 43 so that water cannot enter the chamber 45 when the box member 40, including the top member 42, is suspended beneath the water surface.

As should be understood, the wires 52 are contained within a flexible, insulated cable 53. The wires 52 include a connector 52A that appropriately connects to a connector 30A of the motor 30. Connector means such as a small wire or cable 60 can be attached to the connectors 30A, 52A in order to avoid separation.

In application, the box member 40 serves as a storage means for the device's 10 power source 50, and the weight of the member 40 (with power supply 50) further serves as an anchor for anchoring the decoy 10 at a selected location. However, the box member 40 can further include a ring 90 disposed on its outer surface for attachment of a connecting cord 92 and, at the other end, to an additional anchor 94 in order to further anchor the decoy 10 at the selected location. As a result, the anchor portion will downwardly suspend from the box member 40 in the direction of arrow "A", and the body portion 20 will upwardly extend from the box member 40 in the direction of arrow "B". The cable 53 allows the decoy body 20 to move around on the surface of the water simulating natural movement while the anchoring weight 40 prevents the body 20 from moving beyond an anchor area.

In the preferred embodiment, the power source 50 is a 6 to 12-volt rechargeable battery. The activation of the power source 50 forcefully activates the motor 30 to provide oscillation of the body 20. The movement of the decoy 20 creates a substantial amount of splashed water while moving the decoy to emulate a natural feeding position of ducks and other waterfowl. The motor 30 can include a switch 55 that periodically shuts the motor 30 off to conserve power and then after a dwell turns the motor 30 back on.

The movement and splashed water causes ripples (not shown) upon the surface of the water to further attract waterfowl. The simulation of potential feed further heightens the desirability of the target area and provides added incentive for the victims to approach. The movement attracts game by simulating fish splashing about and/or aggressive hunting and/or feeding behavior of waterfowl to further aid in attracting the game.

The motor 30 can be a submersible pump and can pump water through line 31 to create further splashing and water movement. The outlet 31A of the line 30 is disposed near the water surface.

The weight and density of the motor and body 20 are such that the decorated body portion 20 is above the water surface while the undecorated motor 30 and housing 25 are below the water surface and therefore not visible. Thus the water line ("WL") of the decoy 10 in the water would be near the bottom of the body 20.

The device 10 can further include a switch 55 disposed on the outer surface of the box member 40. The switch 55 is in electrical communication with the electrical wires 52 extending from the power source 50 such that the motor 30 is activated in response to activating the switch 55. The switch 55 allows the motor 30 to run either continuously or to pulse on periodically to conserve power.

From the description above, a number of advantages of the present waterfowl feeding decoy become evident:

(a) The presence of the waterfowl feeding decoy will provide superior movement and simulation of a true feeding waterfowl, luring waterfowl for hunting purposes.
(b) The oscillating of the waterfowl in a feeding position will allow activation during optimal times for luring.
(c) The oscillating body portion causes motion of both decoy and water. This movement not only attracts waterfowl but deters formation of ice on the surface of water during freezing conditions.
(d) The box member with a power source therein serves as an anchor for anchoring the decoy at a selected location.
(e) The waterfowl decoy is lightweight and portable.
(f) The waterfowl decoy is easy to set up and easy to operate.

Although the description above contains many specificities, these should not be construed as limiting the scope of the invention but as merely providing illustrations of some of the presently preferred embodiments of this invention. It will be obvious to those skilled in the art that modifications may be made to the embodiments described above without departing from the scope of the invention.

Thus the scope of the invention should be determined by the appended claims in the formal application and their legal equivalents, rather than by the examples given.

I claim:

1. A partially submersible waterfowl feeding decoy comprising:
    a hollow body resembling the rearward portion of a waterfowl mounted to a top of a submersible motor such that a decorated portion of said hollow body will float above said motor and a water surface while said motor will float beneath said water surface,
    wherein said motor drives a pump, said pump includes a pump outlet spaced separate from said body,
    wherein said hollow body defines a water line and wherein said pump outlet is adjacent but just below said water line,
    a box member including a top member such that opening the top member allows access to a chamber disposed within the box member, and wherein closing the top member forms a watertight seal between the top member and the box member, said top member further includes an aperture disposed at the top member,
    a power source positioned in the chamber, an electrical cable extending from the power source up through said aperture and electrically connected directly to the motor, below the water surface,
    wherein said box member serves as a watertight storage means for the power source and further serves as an anchor for anchoring the decoy at a selected location, and said electrical cable is attached directly to said motor and serves as a tether allowing said body to move on the surface of the water while remaining anchored to said box member.

2. The decoy as recited in claim 1, wherein said power source is a 6 to 12-volt power source and wherein said electrical cable serves to deliver electricity to said motor.

3. The decoy as recited in claim 2, wherein said box and power source are heavier than water.

4. The decoy as recited in claim 2, wherein said motor includes a switch that periodically turns said motor off to conserve power and then after a dwell period cycles the motor back on.

5. A waterproof box and decoy waterfowl combination having a body mounted to a motor, said box member and decoy comprising:
    a hollow body resembling the rearward portion of a waterfowl mounted to a top of a submersible motor for motion with said motor such that a decorated portion of said hollow body will float above said motor and a water surface while said motor will float beneath said water surface,
    wherein said motor drives a pump, said pump includes an outlet spaced separate from said body and disposed below said water surface,
    a closure such that opening the closure allows access to a chamber disposed within the box member, and wherein closing the closure forms a watertight seal between the closure and the box member, said box further includes an aperture, a power source positioned in said chamber, and electrical wires extending from said power source through said aperture and physically and electrically connected directly to the waterfowl's motor below the surface of the water and said electrical wires serve as a tether allowing said body to move on the surface of the water while remaining anchored to said box member, wherein said box serves as a watertight storage for the power source and further serves as an anchor for anchoring the decoy at a selected location.

6. The box member and decoy as recited in claim 5, wherein said power source is a six to twelve volt power source.

7. The box member and decoy as recited in claim 5, wherein said electrical cable serves as a tether allowing said body to move on the water while remaining anchored to said box member.

8. The box member and decoy as recited in claim 5, wherein said box containing said power source is heavier than water.

9. The box member and decoy as recited in claim 8, wherein said power source includes a switch that periodically turns said motor off to conserve power and then turns the motor back on.

10. A waterproof box member and decoy comprising:
   a top member such that opening the top member allows access to a chamber disposed within the box member, and wherein closing the top member forms a watertight seal between the top member and the box member, said box further includes an aperture, a power source positioned in said chamber, and electrical wires extending from said power source through said aperture and connected to the decoy's pump, said pump including an outlet, wherein said box member serves as a watertight storage for the power source and further serves as an anchor for anchoring the decoy at a selected location,
   a hollow body resembling the rearward portion of a waterfowl mounted to a top of said pump such that said hollow body will float above said pump and a water surface while said pump will float beneath said water surface, said hollow body further defines a water line, wherein said water line is approximately adjacent but just above said pump outlet,
   and said electrical wires are attached directly to said pump below the water surface and serve as a tether allowing said hollow body to move on the surface of the water while remaining anchored to said box member such that said hollow body and pump travel in an oscillating manner when said pump is turned on.

11. The waterproof box and decoy as recited in claim 10, wherein said power source is a six to twelve volt power source.

12. The waterproof box and decoy as recited in claim 10, wherein said power source includes a switch that periodically cycles power supplied to the decoy off and on to conserve power.

13. The waterproof power supply box and decoy as recited in claim 10, wherein said box containing said power source is heavier than water.

* * * * *